United States Patent [19]

Wimmer et al.

[11] Patent Number: 4,668,491

[45] Date of Patent: May 26, 1987

[54] PROCESS FOR THE SELECTIVE HYDROLYSIS OF INORGANIC SULFUR COMPOUNDS

[75] Inventors: Theodor Wimmer, Munich; Han-Joachim Kremer, Poing, both of Fed. Rep. of Germany

[73] Assignee: Süd-Chemi Aktiengesellschaft, Munich, Fed. Rep. of Germany

[21] Appl. No.: 760,482

[22] Filed: Jul. 30, 1985

[30] Foreign Application Priority Data

Aug. 9, 1984 [DE] Fed. Rep. of Germany ....... 3429394

[51] Int. Cl.[4] .......................... B01J 8/00; C01B 17/00; C01B 17/16; C01C 3/00
[52] U.S. Cl. .................................... 423/244; 423/236; 423/564
[58] Field of Search ................... 423/564, 236, 244 A, 423/244

[56] References Cited

U.S. PATENT DOCUMENTS

| | | | |
|---|---|---|---|
| 3,058,800 | 10/1962 | Frevel et al. | 423/564 X |
| 3,554,689 | 1/1971 | Bloemberger et al. | 423/219 |
| 3,752,877 | 8/1973 | Beavon | 423/564 X |

FOREIGN PATENT DOCUMENTS

| | | | |
|---|---|---|---|
| 761027 | 12/1970 | Belgium | 423/244 |
| 54-18466 | 10/1979 | Japan | 423/236 |
| 605838 | 7/1948 | United Kingdom | 423/244 |
| 953216 | 3/1964 | United Kingdom | 423/244 |

*Primary Examiner*—Gregory A. Heller
*Attorney, Agent, or Firm*—William R. Price

[57] ABSTRACT

Process and catalyst for the selective catalytic hydrolysis of the inorganic sulfur compounds COS and/or $CS_2$ being present in CO containing process gases. The process gas is passed over an alkalized chromium oxide-aluminum oxide catalyst in the presence of $H_2O$.

6 Claims, No Drawings

PROCESS FOR THE SELECTIVE HYDROLYSIS OF INORGANIC SULFUR COMPOUNDS

FIELD OF THE INVENTION

The invention pertains to a process and catalyst for the selective catalytic hydrolysis of the inorganic sulfur compounds COS and/or $CS_2$ being present in CO containing process gases.

BACKGROUND OF THE INVENTION

It is known that inorganic sulfur compounds such as COS and $CS_2$ may be removed from process gases in accordance with physical and chemical processes by washing solutions or by adsorption. A summarizing review of these known processes is to be found in R. D. Stoll and S. Röper, "Erdöl und Kohle," Volume 35, pages 380–385 (1982). These processes are used mainly for the purification of natural gas (sour gas) containing acidic sulfur compounds, but are also suitable for the removal of sulfur compounds from process gases such as flue-gases, Claus tail gases and gases resulting from the refinement of coal. The inorganic sulfur compounds can be removed from the gas, for instance, physically, with the aid of washing solutions containing N-methyl pyrrolidone, propylene carbonate or propyl ethylene glycol-dimethyl ether, or chemically, by transformation with basic* organic compounds (e.g. diisopropanol amine, potassium-dimethyl-aminoacetic acid, alkanol amines). The adsorption processes are carried out with the aid of adsorption agents such as $Fe_2O_3$, activated carbon, molecular sieves, dolomite, silica gel and similar compounds. The processes mentioned above, however, are costly and cumbersome.

*"basic organic compounds" indicates organic compounds which react in an alkaline manner.

DESCRIPTION OF THE PRIOR ART

Further, an attempt has been made to transform the inorganic compounds COS and/or $CS_2$ into hydrogen sulfide by catalytic hydrolysis. The hydrogen sulfide is then transformed generally into elemental sulfur according to the Claus process. By the Claus process, a portion of the hydrogen sulfide is oxidized first to $SO_2$ with oxygen. That reacts with another portion of the hydrogen sulfide to yield elemental sulfur. The remaining unconverted hydrogen sulfide can be removed, as for example, by adsorption on zinc oxide.

A process for the removal of COS from gases containing oxygen and hydrogen by catalytic hydrolysis is known from U.S. Pat. No. 3,554,689. This patent discloses a process in which oxygen is removed first by conversion with hydrogen in the presence of a highly active hydrogenation catalyst, whereupon COS is hydrolyzed to $H_2S$ at temperatures below 150° C. The catalyst used for the hydrolysis contains one or several oxides of Group VI and VIII metals, and specifically cobalt molybdate. The catalytic metal oxides may be supported on an aluminum oxide carrier. The catalyst is indeed selective for the hydrolysis of COS at low temperatures, but exhibits a low level of activity for the hydrolysis of $CS_2$. Moreover, it is inactive for the hydrolysis of HCN, which is often present in process gases. The catalyst is thus extremely limited in its applicability and does not solve industrial problems as they actually exist. The processes occurring in the hydrolysis of COS and $CS_2$ can be expressed by the following reactions:

$$COS + H_2O \rightleftharpoons CO_2 + H_2S \quad (1)$$

$$COS + H_2 \rightleftharpoons CO + H_2S \quad (2)$$

$$CS_2 + 2H_2O \rightleftharpoons CO_2 + 2H_2S \quad (3)$$

The reactions to which this invention is directed are mainly the reactions conforming to the equations (1) and (3) proceeding from the left side to the right side, i.e. the corresponding forward reactions. In the presence of hydrogen, the reaction represented by equation (2) proceeding from the left side to the right side also takes place, and is desirable. However, the reaction represented by (2) proceeding from the right side to the left side, i.e. the reverse reaction is undesirable. (This reaction is hereafter referred to as 2R, where R represents "right to left" or "reverse"). This reaction (2R) always occurs, since the reaction represented by (2) is a reversible reaction, and equilibrium is favored by a high partial pressure of CO. In this case, the undesired COS is thus reformed from the $H_2S$ (having been originally formed in accordance with reactions (1) and (2)) or from that originally present in the gas.

SUMMARY OF THE INVENTION

The object of the invention, therefore, is to provide a process of the type initially defined, which suppresses the reaction (2R) even if it is favored thermodynamically by the partial pressure of CO.

According to this invention, the problem is solved by passing the process gas over an alkalized chromium oxide-aluminum oxide catalyst in the presence of $H_2O$. Further, the object of the invention is the provision of a catalyst selective for the hydrolysis of COS or $CS_2$ even in the presence of high partial pressures of CO.

DESCRIPTION OF THE PREFERRED EMBODIMENT

Since the catalyst of this invention is active for dehydrogenation, it is surprising that the reaction (2R) is suppressed, since reaction (2R) is a dehydrogenation reaction as well.

The catalyst of this invention contains about 1 to 40, preferably about 3 to 20 wt.% $Cr_2O_3$ and about 0.1 to 15, preferably about 1 to 10 wt.% of a basic* alkali metal compound (calculated as $Me_2O$, wherein Me represents Na, K, Rb, or Cs). Commonly used alkali metal compounds which react in an alkaline manner are hydroxides, carbonates, hydrogen carbonates, acetates or oxalates of the above mentioned alkali metals.

*a "basic alkali metal compound" indicates a compound which reacts in an alkaline manner.

$K_2CO_3$ is a preferred basic alkali metal compound.

The carrier substance of the catalyst according to the invention is aluminum oxide, whereby all modifications are used. However, gamma aluminum oxide is preferred, which usually has a surface area of 30 to 300 $m^2/g$, preferably 60 to 220 $m^2/g$. The process gas is usually passed over the catalyst at elevated pressure. Preferably, the process gas is passed over the catalyst at temperatures of 100° to 350° C., particularly of 100° to 300° C.

Further, it has been found that using the catalyst according to the invention, surprisingly, a hydrolysis of hydrogen cyanide (HCN), which is often present in process gases, takes place. The invention, therefore, also pertains to a process, in which the process gas contains HCN.

The hydrogen sulfide obtained as a reaction product of the process of this invention can be removed in known manner. For this purpose, equipment may be connected to the outlet side of the hydrolysis reaction in order to scrub the hydrogen sulfide out of the process gas or to absorb the hydrogen sulfide from the process gas. The hydrogen sulfide recovered from the washing liquids or the absorption agents, respectively, can then be converted to elemental sulfur according to the Claus process.

If the process gas after washing and absorption, respectively, still contains traces of $H_2S$, a zinc oxide guard reactor may be added to the outlet side. Should the process gas be used, for instance, for methanol synthesis, then the operating temperature at a dry space velocity of 1000 volume units of gas per volume unit of catalyst per hour can be about 180° C. Should the process gas be used for ammonia synthesis, then the temperature at a wet space velocity of 10,000 volume units of gas per volume unit of catalyst per hour can be 220° C. In both cases, the $H_2S$ content of the synthesis gases must be less than 0.1 ppm.

The catalysts according to the invention can generally be produced as follows.

The aluminum oxide carrier is immersed in a chromium salt solution at temperatures ranging from 20° to 120° C.

Subsequently, the catalyst is sequentially dried and calcined in steps at temperatures ranging from 80° to 800° C. This is then followed by a subsequent immersion in a potassium salt, preferably $K_2CO_3$, and by another stepwise drying at a temperature ranging from 80° to 180° C.

A catalyst thus produced, containing 8 to 12 wt.% $Cr_2O_3$ and about 4 wt.% $K_2CO_3$ (calculated as $K_2O$), with the remainder composed of gamma $Al_2O_3$ was formed into tablets having the dimensions of 6×6 and 4.5×4.5 mm, respectively. The bulk density of the catalyst amounted to 1.0 kg/l. The tablets had a side crush strength of 16 kg. The specific surface area of the catalyst was about 150 m²/g. The pore volume was about 0.3 cm³/g.

The catalysts according to the invention have been investigated for their selectivity regarding the conversion of COS corresponding to the following examples. Selectivity (Sel) is defined as the difference between the COS value obtained and the COS value which could be obtained after reaching equilibrium according to equation (2), i.e. if reaction (2R) is not suppressed. A selectivity of 100% would correspond to a COS value which would result if reaction (1) reaches equilibrium.

The mathematical equation for the selectivity may be expressed as follows:

$$\text{Sel}^* = 100 - \frac{\text{COS obtained} - \text{COS equilibrium (1)}}{\text{COS equilibrium (2)} - \text{COS equilibrium (1)}} \cdot 100$$

*Selectivity

The different COS values in the equation above are expressed in ppm, which will result in Sel being expressed as a dimensionless number.

EXAMPLE 1

A process gas, the composition of which is shown in Table I, was converted at a pressure of 9.2 atm., a temperature of 201° C., a space velocity of 900 volume units of gas per volume unit of catalyst per hour (vvh) using steam (volume ratio steam/gas=0.131) and a catalyst with the following composition: 9% $Cr_2O_3$, 4% $K_2O$, remainder composed of gamma $Al_2O_3$. The composition of the exit gas as well as the theoretical equilibrium values for COS conforming to the equations (1) and (2) and the selectivity calculated from this are given in Table I as well.

TABLE I

| Components | Gas Composition | |
|---|---|---|
| | Inlet | Outlet |
| CO | 97.16 Vol. % | 97.24 Vol. % |
| $CO_2$ | 0.48 Vol. % | 0.96 Vol. % |
| $H_2$ | 0.35 Vol. % | 0.35 Vol. % |
| $N_2$ | 0.93 Vol. % | 0.98 Vol. % |
| $H_2S$ | 135 ppm | 5097 ppm |
| COS | 3589 ppm | 34 ppm |
| $CS_2$ | 767 ppm | 0 ppm |
| COS equilibrium (1) | 0.047 ppm | |
| COS equilibrium (2) | 4919.114 ppm | |
| Selectivity | 99.3% | |

EXAMPLE 2

A process gas, the composition of which is shown in Table II, was converted at a pressure of 9.2 atm., a temperature of 145° C., a space velocity of 1330 vvh, using steam (volume ratio steam/gas=0.076) and a catalyst with the following composition:

11% $Cr_2O_3$, 5% $K_2O$, remainder composed of gamma $Al_2O_3$.

TABLE II

| Components | Gas Composition | |
|---|---|---|
| | Inlet | Outlet |
| CO | 96.95 Vol. % | 96.99 Vol. % |
| $CO_2$ | 0.87 Vol. % | 0.87 Vol. % |
| $H_2$ | 0.40 Vol. % | 0.42 Vol. % |
| $N_2$ | 0.84 Vol. % | 0.83 Vol. % |
| $H_2S$ | 4568 ppm | 4698 ppm |
| COS | 117 ppm | 4 ppm |
| $CS_2$ | 5 ppm | 0 ppm |
| COS equilibrium (1) | 0.042 ppm | |
| COS equilibrium (2) | 4414.372 ppm | |
| Selectivity | 99.9% | |

EXAMPLE 3

A process gas, the composition of which is shown in Table III, was converted at a pressure pf 9.2 atm., a temperature of 134° C. and a space velocity of 770 vvh using steam (volume ratio steam/gas=0.129) and a catalyst with the following composition:

12% $Cr_2O_3$, 4% $K_2O$, remainder composed of gamma $Al_2O_3$.

The composition of the exit gas as well as the theoretical equilibrium values for COS conforming to the equations (1) and (2) and the selectivity calculated from this are given in Table III as well.

TABLE III

| Components | Gas Composition | |
|---|---|---|
| | Inlet | Outlet |
| CO | 97.02 Vol. % | 97.06 Vol. % |
| $CO_2$ | 0.88 Vol. % | 0.90 Vol. % |
| $H_2$ | 0.35 Vol. % | 0.33 Vol. % |
| $N_2$ | 0.79 Vol. % | 0.71 Vol. % |
| $H_2S$ | 4527 ppm | 4617 ppm |
| COS | 183 ppm | 3 ppm |
| $CS_2$ | 5 ppm | 1 ppm |
| COS equilibrium (1) | 0.019 ppm | |
| COS equilibrium (2) | 4482.839 ppm | |

TABLE III-continued

| Components | Gas Composition | |
|---|---|---|
| | Inlet | Outlet |
| Selectivity | | 99.9% |

EXAMPLE 4

A process gas, the composition of which is shown in Table IV was converted at a pressure of 5.1 atm., a temperature of 164° C. and a space velocity of 2980 vvh using steam (volume ratio steam/gas=0.074) and a catalyst with the following composition:

8% $Cr_2O_3$, 4% $K_2O$, remainder composed of gamma $Al_2O_3$.

The composition of the exit gas as well as the theoretical equilibrium values for COS conforming to the equations (1) and (2) and the selectivity calculated from this are given in Table IV as well.

TABLE IV

| Components | Gas Composition | |
|---|---|---|
| | Inlet | Outlet |
| CO | 20.65 Vol.% | 20.45 Vol.% |
| $CO_2$ | 35.39 Vol. % | 35.42 Vol. % |
| $H_2$ | 40.95 Vol. % | 41.10 Vol. % |
| $CH_4$ | 2.60 Vol. % | 2.61 Vol. % |
| $H_2S$ | 3627 ppm | 4199 ppm |
| COS | 480 ppm | 3.74 ppm |
| COS equilibrium (1) | | 2.28 ppm |
| COS equilibrium (2) | | 120.497 ppm |
| Selectivity | | 98.7% |

EXAMPLE 5

A process gas, the composition of which is shown in Table V, was converted at a pressure of 41.8 atm., a temperature of 179° C. and a space velocity of 2850 vvh using steam (volume ratio steam/gas=0.085) and a catalyst with the following composition:

8% $Cr_2O_3$, 3% $K_2O$, remainder composed of gamma $Al_2O_3$.

The composition of the exit gas as well as the theoretical equilibrium values for COS conforming to the equations (1) and (2) and the selectivity calculated from this are given in Table V as well.

TABLE V

| Components | Gas Composition | |
|---|---|---|
| | Inlet | Outlet |
| CO | 19.25 Vol. % | 19.23 Vol. % |
| $CO_2$ | 34.55 Vol. % | 34.59 Vol. % |
| $H_2$ | 43.88 Vol. % | 43.86 Vol. % |
| $CH_4$ | 1.90 Vol. % | 1.90 Vol. % |
| $H_2S$ | 3683 ppm | 4227 ppm |
| COS | 523 ppm | 4.17 ppm |
| COS equilibrium (1) | | 1,641 ppm |
| COS equilibrium (2) | | 114.491 ppm |
| Selectivity | | 97.7% |

EXAMPLE 6

A process gas, the composition of which is shown in Table VI, was converted at a pressure of 8 bar, a temperature of 222° C. and a space velocity (wet gas) of 2040 vvh using steam (volume ratio steam/gas=0.5 to 1.0) and a catalyst with the following composition:

9% $Cr_2O_3$, 4% $K_2O$, remainder composed of gamma $Al_2O_3$.

For the exit gas only the values for COS (0.81 ppm) and HCN (2.0 ppm) were determined. From this a COS conversion of 99% and a HCN conversion of 96% were calculated. Thus, the example demonstrates that the catalyst possesses a high efficiency concerning the hydrolysis of HCN.

TABLE VI

| Components | Gas Composition Inlet |
|---|---|
| CO | 34.6 Vol. % |
| $CO_2$ | 31.6 Vol. % |
| $H_2$ | 33.8 Vol. % |
| COS | 81 ppm |
| HCN | 51 ppm |

EXAMPLE 7

A process gas, the composition of which is shown in Table VII was converted at a pressure of 8 bar, a temperature of 280° C. and a space velocity (wet gas) of 2040 vvh using steam (volume ratio steam/gas=0.5 to 1.0) and a catalyst with the following composition:

10% $Cr_2O_3$, 5% $K_2O$, remainder composed of gamma $Al_2O_3$.

For the exit gas, only the values of COS (2.8 ppm) and HCN (0.0 ppm) were determined. From this, a COS conversion of 93% and a HCN conversion of 100% were calculated.

TABLE VII

| Components | Gas Composition Inlet |
|---|---|
| CO | 34.6 Vol. % |
| $CO_2$ | 31.6 Vol. % |
| $H_2$ | 33.8 Vol. % |
| COS | 40 ppm |
| HCN | 46 ppm |

EXAMPLE 8

A process gas, the composition of which is shown in Example 7, was converted at a pressure of 8 bar, a temperature of 280° C. and a space velocity (wet gas) of 5640 vvh, using steam (volume ratio steam/gas=0.5 to 1.0) and a catalyst with the following composition:

11% $Cr_2O_3$, 4% $K_2O$, remainder composed of gamma $Al_2O_3$.

For the exit gas, only the values for COS (3.2 ppm) and HCN (1.84 ppm) were determined. From this, a COS conversion of 92% and a HCN conversion of 96% were calculated.

We claim:

1. A process for the selective hydrolysis of inorganic sulfur compounds, selected from the group consisting of COS and $CS_2$, contained as an impurity in a process gas, comprising carbon monoxide in a volume concentration of from about 19 to 97% and said inorganic sulfur compounds, which comprises the steps of:

A. passing said process gas and steam in excess of that stoichiometrically required to hydrolyze said inorganic sulfur compounds to $H_2S$ over an alkalized chromium oxide-aluminum oxide catalyst in which the alkalized chromium oxide-aluminum oxide catalyst comprises:

1. 1 to 40% by weight of chromium oxide and 0.1 to 15% of a basic alkali metal compound, calculated as $Me_2O$, where Me represents Na, K, Rb, or Cs, and 2. aluminum oxide in the gamma phase;

B. at elevated temperatures in the range of from 100° to 350° C., and
C. at elevated pressures and
D. selectively hydrolyzing said inorganic compounds to $H_2S$ without substantial conversion of CO to COS.

2. A process, as defined in claim 1, in which the elevated temperature is in the range of from 100° to 300° C.

3. A process, as defined in claim 1, in which the catalyst contains from 3 to 30 wt.% of chromium and from approximately 1 to 10 wt.% of a basic alkali metal compound, calculated as $Me_2O$, where Me represents Na, K, Rb, or Cs.

4. A process, according to claim 1, in which the basic alkali metal compound is $K_2CO_3$.

5. A process, as defined in claim 1, in which HCN, contained in the process gas as an additional impurity, is hydrolyzed with steam over said catalyst.

6. A process, as defined in claim 1, in which the elevated pressure is in the range of about 5 to 42 atmospheres.

* * * * *